(12) United States Patent
Reitterer et al.

(10) Patent No.: US 12,311,622 B2
(45) Date of Patent: May 27, 2025

(54) METHOD OF FINAL ASSEMBLY OF A LIGHT PROJECTOR MODULE

(71) Applicant: TriLite Technologies GmbH, Vienna (AT)

(72) Inventors: Joerg Reitterer, Brunn Am Gebirge (AT); Louahab Noui, East Sussex (GB); Michael Schoeffmann, Baden (AT)

(73) Assignee: TriLite Technologies GmbH, Vienna (AT)

( * ) Notice: Subject to any disclaimer, the term of this patent is extended or adjusted under 35 U.S.C. 154(b) by 453 days.

(21) Appl. No.: 17/747,570

(22) Filed: May 18, 2022

(65) Prior Publication Data

US 2023/0001654 A1    Jan. 5, 2023

(30) Foreign Application Priority Data

May 20, 2021   (EP) .................................... 21175032

(51) Int. Cl.
  *B29D 11/00*   (2006.01)
  *G02B 7/02*    (2021.01)
  (Continued)

(52) U.S. Cl.
  CPC ........ *B29D 11/00807* (2013.01); *G02B 7/025* (2013.01); *G02B 26/0833* (2013.01);
  (Continued)

(58) Field of Classification Search
  CPC ...... B29D 11/00807; G02B 2027/0178; G02B 26/0833; G02B 27/0172; G02B 27/0179; G02B 27/0966
  See application file for complete search history.

(56) References Cited

U.S. PATENT DOCUMENTS 10,718,951 B2    7/2020  Holland et al.
2011/0317235 A1* 12/2011  Desai ................... G02B 26/105
                                              359/212.1
(Continued)

FOREIGN PATENT DOCUMENTS

JP    2015190988 A    11/2015
JP    2019186551 A    10/2019
WO    2010047147 A1    4/2010

OTHER PUBLICATIONS

WO2020/088535 (China wafer level CSP Co. LTD) (Year: 2019).*
Extended European Search Report in corresponding Euroean Patent Application No. 21 17 5032, dated Oct. 20, 2021.

*Primary Examiner* — Minh N Trinh
(74) *Attorney, Agent, or Firm* — Hoffmann & Baron, LLP (57) ABSTRACT

The disclosed subject matter relates to a method of final assembly of a light projector module, including the steps of: providing a base plate, a light source on the base plate, and a micro-electro-mechanical-system (MEMS) scanning assembly, wherein the base plate has, between the light source and the MEMS scanning assembly, a mounting surface accessible at one side of the base plate; positioning a set of one or more lenses on the mounting surface and adjusting the position of the one or more lenses of the set while the light source is emitting and at least one light beam projected by the light projector module is monitored in a display area; and mounting the one or more lenses of the set in the adjusted position fixedly on the base plate.

19 Claims, 4 Drawing Sheets

(51) Int. Cl.
*G02B 26/08* (2006.01)
*G02B 27/01* (2006.01)
*H04N 9/31* (2006.01)

(52) U.S. Cl.
CPC ..... *G02B 27/0172* (2013.01); *G02B 27/0179* (2013.01); *H04N 9/3152* (2013.01); *G02B 2027/0178* (2013.01)

(56) References Cited

U.S. PATENT DOCUMENTS

| | | |
|---|---|---|
| 2017/0153009 A1 | 6/2017 | Mose et al. |
| 2018/0210216 A1* | 7/2018 | Holland ............... H04N 9/3182 |
| 2019/0171091 A1* | 6/2019 | Motobayashi ..... G02B 27/0101 |
| 2022/0373804 A1* | 11/2022 | Noui .................. G02B 27/0176 |
| 2023/0001654 A1* | 1/2023 | Reitterer ............. G02B 27/283 |

\* cited by examiner

METHOD OF FINAL ASSEMBLY OF A LIGHT PROJECTOR MODULE

CROSS-REFERENCE TO RELATED APPLICATIONS

This application claims priority to the European Patent Application No. 21 175 032.8 filed May 20, 2021, the disclosure of which is incorporated herein by reference.

TECHNICAL FIELD

The present disclosed subject matter relates to a light projector module and a method of manufacturing the same.

BACKGROUND

Light projector modules are commonly used in virtual reality (VR) or augmented reality (AR) glasses, helmets or head-up displays for a broad range of applications like navigation, training, entertainment, education or work. A light source emits one or usually three (red, green, blue) light beams carrying an image comprised of pixels onto a moving micro-electro-mechanical-system (MEMS) mirror which deflects the light beams into subsequent directions (angles), one direction (angle) per pixel of the image. For example, the MEMS mirror oscillates fast about a vertical axis and slowly about a horizontal axis to sweep the directions and, thus, scan the light beam/s over the pixels of a display area row by row and line by line.

In VR applications, the display area is typically a (miniature) reflective screen in front of the user's eye. In AR applications the display area is a semi-transparent combiner which redirects the light beam/s towards the user's eye while concurrently superposing them with light field from a surrounding. In either case the cornea and the lens of the user's eye focus each light beam from a specific direction onto one image point on the retina, so that all image points on the retina then form the image perceived by the user. In head mounted displays the light projector may even project the scanned light beam/s directly into the user's eye, without any reflective screen or semi-transparent combiner. In general video beamer applications the light projector module can be used to project an image onto an external screen like a reflective wall or a movie screen.

In all these applications collimating and directing the light beam/s as good as possible is critical to obtain a sharp, undistorted and evenly lit image. Usual light sources such as laser diodes, however, do not emit perfectly collimated light beams so that separate collimation lenses need to be added downstream. The focal length and the position of these lenses needs to be specifically tailored to the mounting position, wavelength and type of the light source used in the projector module. When the light source emits multiple light beams of different colours, in general one or more lenses have to be individually positioned for each light beam.

In the prior art a specific light source is first assembled with specifically tailored collimation lenses, which involves a first relative positioning (aligning) step between the light source and the lenses, before this sub-assembly is joined with the MEMS scanning assembly. The MEMS scanning assembly contains a moving MEMS mirror with individual mounting tolerances which need to be taken into account, too. The joining step hence requires a second relative positioning (aligning) step between the light source/lens sub-assembly and the MEMS scanning assembly. This two-fold alignment process significantly increases labour time and costs for manufacturing a high quality light projector module.

BRIEF SUMMARY

It is an object of the present disclosed subject matter to overcome the inconveniences of the state of the art and provide a light projector module of high quality which can be manufactured in a fast and cost-efficient manner.

This object is achieved in a first aspect of the disclosed subject matter with a method of manufacturing a light projector module, comprising the steps of:

firstly, providing a base plate with two opposite sides, a light source mounted on the base plate for emitting at least one light beam, and a micro-electro-mechanical-system (MEMS) scanning assembly mounted on the base plate at a distance from the light source for scanning the at least one light beam over a display area, wherein the base plate has, between the light source and the MEMS scanning assembly, a mounting surface accessible at one side of the base plate;

secondly, positioning a set of one or more lenses on the mounting surface and adjusting the position of the one or more lenses of the set while the light source is emitting and the at least one light beam projected by the light projector module is monitored in the display area; and lastly mounting the one or more lenses of the set in the adjusted position fixedly on the base plate.

The disclosed method allows for an aligning of the entire light projector module in one single step during the manufacturing process. In particular, the light source/lens sub-assembly and the MEMS scanning assembly can be fully joined first, whereupon the light source is turned on and only then, in a final single alignment step, the lens/es are put in and adjusted in position with regard to the overall beam output of the light projector module, e.g., by monitoring the light beam/s in the display area for a desired target alignment. This leads to a significantly faster and more cost-efficient manufacturing of the light projector module. Furthermore, by including the MEMS scanning assembly into the alignment step of the lenses any misalignments within the MEMS scanning assembly, e.g., positional or angular offsets or imperfections of the scanning mirror, can be compensated for in the same step.

In a further embodiment of the disclosed method not only the light source is turned on for the adjustment of the lens set but also the MEMS scanning assembly, so that also uneven curvatures of the surface of the scanning mirror or non-linear movements of the scanning mirror can be accounted for and compensated during the alignment of the light projector module.

After adjusting the lens/es of the set they can be fixed in their adjusted positions by any suitable means, e.g., by clamping them down on the mounting surface, by drilling holes and screwing them down, or by gluing, soldering, or sintering them to the mounting surface, e.g., on their edges, etc. Optionally, the lens set is positioned on the mounting surface via an unhardened glue and then, after adjusting the position/s of the lens/es, is fixedly mounted by hardening the glue. This is least affecting the adjusted positions when mounting. The hardening of the glue can be furthered, e.g., by thermosetting or by ultraviolet (UV) light when a UV hardenable glue is used. During the adjusting and fixing operation the beam alignment is continuously monitored.

In a further embodiment of the disclosed subject matter the MEMS scanning assembly has an arm mounted on and extending from the other side of the base plate, a scanning mirror is movably mounted on the arm and facing the base plate, and a light guide is mounted on the base plate or the arm for directing the at least one light beam from the lens set to the scanning mirror, and, when adjusting the lens set, a separate prism or mirror is adjusted in position on the other side of the base plate, and then, when mounting the lens set, is fixedly mounted in its adjusted position on the base plate. In this way the hit point of the light beam/s on the scanning mirror can be adjusted independently of the collimation function of the lens set during the alignment.

Optionally, the arm is adjustably mounted on the base plate and, when adjusting the lens set, also the arm is adjusted. This allows for additional degrees of freedom of directing the output light beam/s of the light projector module.

Both measures, using a separate prism or mirror and using an adjustable arm, can be used specifically in AR glasses to compensate for face wrap and pantoscopic tilt angles of the eye glasses. In addition, the arm can be adapted to match various input locations of the display area. For example, adjusting the separate prism or mirror can be used for one dimension and adjusting the arm can be used for a perpendicular other dimension to compensate for both (perpendicular) tilt angles.

In a second aspect there is provided a light projector module, comprising:
 a base plate with two opposite sides,
 a light source mounted on the base plate for emitting at least one light beam,
 a micro-electro-mechanical-system (MEMS) scanning assembly mounted on the base plate at a distance from the light source for scanning the at least one light beam over a display area, and
 a set of at least one lens mounted on the base plate between the light source and the MEMS scanning assembly,
 wherein the base plate has, between the light source and the MEMS scanning assembly, a mounting surface accessible at one side of the base plate for adjustably positioning the lens/es of the set on the mounting surface during mounting.

Optionally, the MEMS scanning assembly has an arm mounted on and extending from the other side of the base plate, a scanning mirror being movably mounted on the arm and facing the base plate, in particular under an acute angle, and a light guide is mounted on the base plate or the arm for directing the at least one light beam from the lens set to the scanning mirror.

In a further embodiment, the light guide comprises a separately adjustable prism or mirror which is mounted on the other side of the base plate facing the scanning mirror.

In any of these embodiments, the light source may be configured to emit three mutually spaced light beams, the lens set may have at least one lens per light beam, and the light guide may include a beam combiner to combine the three light beams into a combined light beam directed to the scanning mirror.

In particular, the lens set may comprise, for each light beam, a first cylindrical lens with a first cylinder axis followed by a second cylindrical lens with a second cylinder axis perpendicular to the first cylinder axis.

The disclosed light projector module is particularly suited for miniature implementations, e.g., in VR or AR glasses. In particular, the light projector module may be attached to a temple of a spectacle frame or integrated into the temple.

As to the advantages of the disclosed light projector module and its various embodiments the same applies as to the manufacturing method of the disclosed subject matter detailed above.

BRIEF DESCRIPTION OF THE DRAWINGS

The disclosed subject matter will now be described by means of exemplary embodiments thereof with reference to the enclosed drawings, in which show.

DETAILED DESCRIPTION

Figure 1:
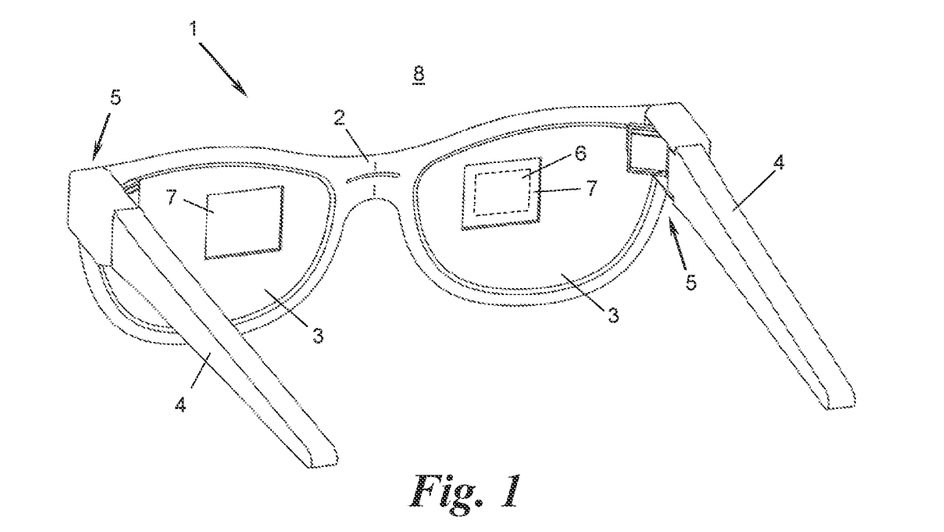
FIG. 1 the light projector module of the disclosed subject matter integrated into a pair of AR glasses in a perspective view.

FIG. 1 shows a pair of augmented reality (AR) glasses 1 comprising a spectacle frame 2, a pair of eye glasses 3 and a pair of temples 4. Attached to each temple 4 is a light projector module 5 which projects an image 6 onto a semi-transparent combiner 7. The semi-transparent combiner 7 is supported by the spectacle frame 2 or an eyeglass 3 or integrated into the latter. The semi-transparent combiner 6, e.g., a waveguide or a holographic combiner, superposes the image 6 projected by the light projector module 5 with a light field from a surrounding 8 so that the wearer of the AR glasses 1 can see the image 6 overlaying ("augmenting") the surrounding 8.

The image 6 can, e.g., be monochromatic or coloured, a single image or part of a video sequence of images. The image/s 6 can augment any surrounding 8 such as a landscape, an urban environment, a road, a classroom, a workplace etc. so that the user can perceive additional information, e.g., for navigation, work, education, training or entertainment as an overlay ("AR image") of the light field ("view") of the surrounding 8.

In the example of FIG. 1, the light projector module 5 (here: two modules 5, one per temple 4) is built into AR glasses and used in combination with a semi-transparent combiner 7. A similar application of the light projector module 5 could be in an AR helmet worn by a user, a handheld AR device like a smartphone with a camera, or an AR head-up display for a vehicle which all use a semi-transparent combiner 7 as the display area of the light projector module 5. If desired, suitable re-lay optics can be interposed between the light projector module 5 and the semi-transparent combiner 7.

Instead of the semi-transparent combiner 7 the light projector module 5 could be used with any other display area, e.g., a conventional reflective projection screen such as a miniature screen mounted on the frame 2 of virtual reality (VR) glasses, or a projection wall or a movie screen, for example when the light projector module 5 is used as a miniature (or full-scale) video beamer. The light projector module 5 could even be used to directly project the image 6 directly into the user's eye, optionally with suitable optics therebetween.

The light projector module 5 can be built into a separate housing (not shown) or be directly integrated into the spectacle frame 2 or one of its temples 4, i.e., use the spectacle frame 2 or a temple 4 as its housing. For ease of representation, FIGS. 2-5 show the light projector module 5 without housing. It goes without saying that the light projector module 5 will usually have some sort of protective housing which may include a transparent cover, window or dome on its image projecting side for mechanical and dust protection.

Referring to FIGS. 2-5, the light projector module 5 has a base plate 10 with two opposite sides 11, 12, a rear end 13 and a front end 14. The base plate 10 can support a printed circuit board (PCB) 15 at its rear end 13 or be a PCB itself. For better heat dissipation, the base plate 10 is optionally made of a thermally conductive material such as aluminium, steel or another metal or, if the base plate 10 is a PCB itself, may have appropriately metallized areas and/or thermal ducts.

On its one side 11 the base plate 10 mounts a light source 16 for emitting one or more (here: three) light beams 17-19. For a mono- or duochrome image 6 one or two light beams 17 or 17, 18, respectively, may suffice. For a full colour image 6 three light beams 17-19 of the primary colours red, green and blue are used as known in the art. For improving image quality also more than three light beams 17-19 of the primary colours red, green and blue can be used. To add further functionalities such as sensing, light beams with invisible wavelengths, e.g., infrared or ultra-violet, can be integrated as well.

The light beams 17-19 usually carry the image 6 in a time-multiplexed manner, i.e., the intensity values of the image pixels one after the other, e.g., row-by-row and line-by-line per image 6 comprised of a grid of pixels, and image-by-image per video comprised of a sequence of images 6.

The light source 16 can be of any kind including gas lasers, fibre lasers, semiconductor lasers etc. For miniaturisation the light source 16 may employ LEDs, micro LEDs or laser diodes, e.g., edge-emitting laser diodes or surface-emitting laser diodes, one per light beam 17-19.

The light beams 17-19 exit the light source 16 on a front side 20 thereof and are mutually spaced. The light beams 17-19 may exit the side 20 at different positions, under different angles and different mutual spacings. In the shown example, the light beams 17-19 are parallel to each other and lie in a common plane which runs parallel to and at a distance from the one side 11 of the base plate 10. This is not obligatory but makes it easier to combine the different light beams 17-19 into a single combined light beam, as will be explained later on.

Downstream—i.e., when seen in the direction of the light beams 17-19—of the light source 16 is a set of lenses 21-26 for collimating, shaping and/or directing the light beams 17-19. For a light source 16 based on laser diodes the light beams 17-19 will usually diverge when exiting the side 20 so that they need to be collimated as best as possible for a sharp image 6. The lenses 21-26 will therefore usually have the primary function of collimation. As the light beams 17-19 may diverge differently in a first axis 27 and a second axis 28 perpendicular to the first axis 27 (the "fast" and "slow" axes of laser diodes) the lenses 21-26 may need to collimate differently in those two axes 27, 28.

To this end, an astigmatic lens may be used per light beam 17-19, or two separate cylindrical lenses per light beam 17-19, i.e., a first cylindrical lens 21, 23, 25 with a cylinder axis parallel to the first axis 27 followed by a second cylindrical lens 22, 24, 26 with a cylinder axis parallel to the second axis 28. Of course, any other number, type and combination of lenses can be used in the lens set 21-26 to collimate the light beams 17-19 as desired, e.g., also so-called meta lenses. Furthermore, the lenses 21-26 could also shape, shift and/or deflect the light beams 17-19, in particular to make them parallel and lie in a common plane parallel to the side 11, if needed, for example by incorporating prisms, waveguides, diffractive gratings, meta surfaces and the like into the lenses.

The lens set 21-26 is mounted on the base plate 10 in a substantially flat area thereof which constitutes a mounting surface 29. On the mounting surface 29 the lenses 21-26 can be freely adjusted in position ("aligned") with respect to the light beams 17-19, as will be detailed later on.

The mounting surface 29 is accessible from the outside of the light projector module 5 at the side 11 of the base plate 10, at least when the housing of the light projector module 5 is removed. The lens set 21-26 is mounted to the mounting surface 29 by, e.g., clamping it down with a clamp or top plate (not shown), by drilling holes and screwing it down, or by gluing, soldering, sintering or the like. In particular, the lens set 21-26 may first be loosely positioned on the mounting surface 29 with a thin layer of yet unhardened glue G (FIG. 5), then the lenses 21-26 are adjusted in position for alignment, and finally are fixedly mounted to the mounting surface 29 by hardening the glue G. For example, an ultraviolet (UV) curable viscous glue G can be used, which is hardened by UV light for the final fixing of the lenses 21-26 in their adjusted positions.

Downstream of the lens set 21-26 the light beams 17-19 enter a light guide 30 which combines and directs them as a "combined" light beam 31 to a micro-electro-mechanical system (MEMS) scanning assembly 32 on the other side 12 of the base plate 10. To this end, the light guide 30 may pass through or pass ("wrap") around the base plate 10 from the one side 11 to the other side 12. The light guide 30 may be mounted on the base plate 10. In the present example the light guide 30 passes through a cut-out 33 in the front end 14 of the base plate 10. Should the light beams 17-19 exit the lens set 21-26 under an angle that lets the light beams 17-19 pass through or by the base plate 10, that section of the light beams 17-19 where they pass from one side 11 to the other side 12 of the base plate 10 is part of the light guide 30.

In the present example the light guide 30 is a sequence of: a beam combiner section 34 with two semi-transparent mirrors 35, 36 which combine the incident light beams 17-19 to the combined single light beam 31; an inverting prism 37 wrap-ping around the edge of the base plate 10 by passing through the cut-out 33; an optional wave plate 38 for controlling the polarisation of the light beam/s 17-19, 31; and an optional separate prism or mirror 39 for adjusting the final direction of the light beam/s 17-19, 31 exiting the light guide 30 to the MEMS scanning assembly 32.

The optional prism or mirror 39 is mounted on the other side 12 of the base plate 10 adjustably in the very same way as the lens set 21-26 is mounted on the mounting surface 29, e.g., by first loosely positioning the mirror or prism 39 on the other side 12 via an unhardened glue G, then adjusting it in position and finally hardening the glue G.

The optional wave plate 38 could also be put elsewhere in the path of the light beam/s 17-19, 31, e.g., between the optional prism or mirror 39 and the MEMS scanning assembly 32 or between the lens set 21-26 and the beam combiner section 34. It is also possible to use a separate wave plate 38 for each of the light beams 17-19 before they enter the beam combiner section 34.

Instead of or in addition to the wave plate 38 one or more optical attenuators could be included, too. Such a attenuators could be put anywhere in the path of the light beams 17-19, 31, e.g., at the location described above for the wave plate/s 38. For example, such attenuator/s could be combined with the wave plate/s 38 or integrated therein.

Furthermore, the light guide 31 may optionally include an aperture 40, e.g., at the exit of the inverting prism 37 or wave plate 38. The aperture 40 can be in the form of a sheet metal plate, an opaque sticker or a selectively absorbing coating with a centre hole and will block any stray light outside of the light beams 17-19, 31 from hitting the MEMS scanning assembly 32.

The MEMS scanning assembly 32 is configured to scan the light beams 17-19, 31 received from the light source 16 via the lens set 21-26 and the light guide 30 over the desired display area, e.g., the semi-transparent combiner 7 of the AR glasses 1, a reflective screen in front of the light projector module 5, or even directly the user's eye via optional optics. For example, the MEMS scanning assembly 32 scans the light beam/s 17-19, 31 row by row and/or line by line over the display area to project the image 6 pixel by pixel according to image pixel information modulated onto the light beams 17-19.

Figure 4:
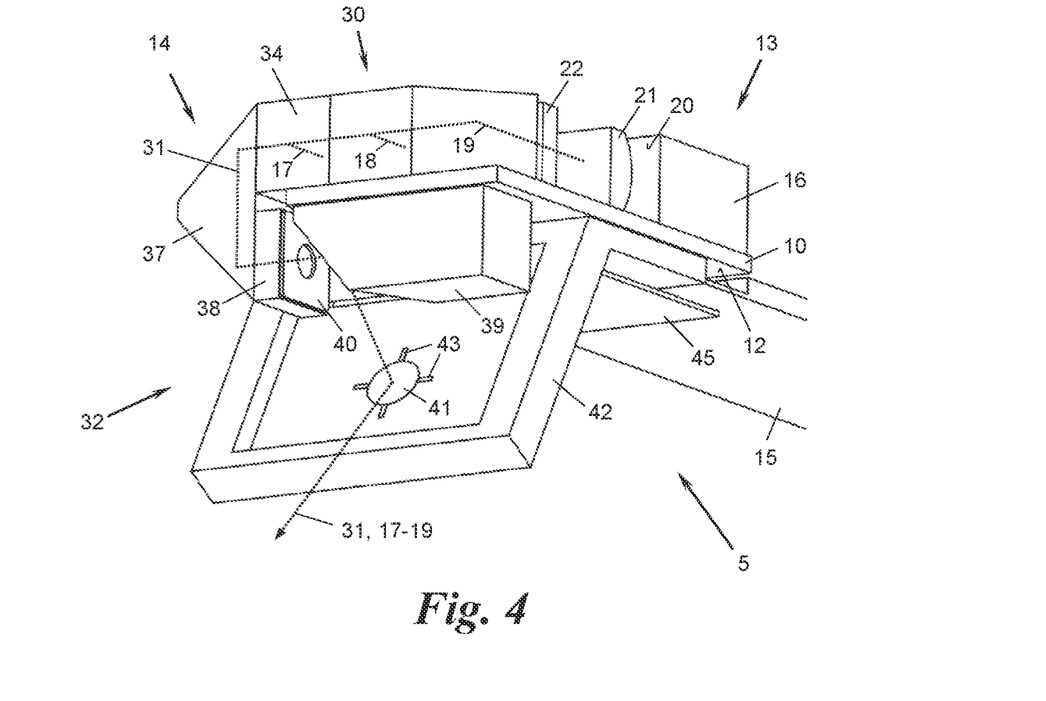
Figure 5:
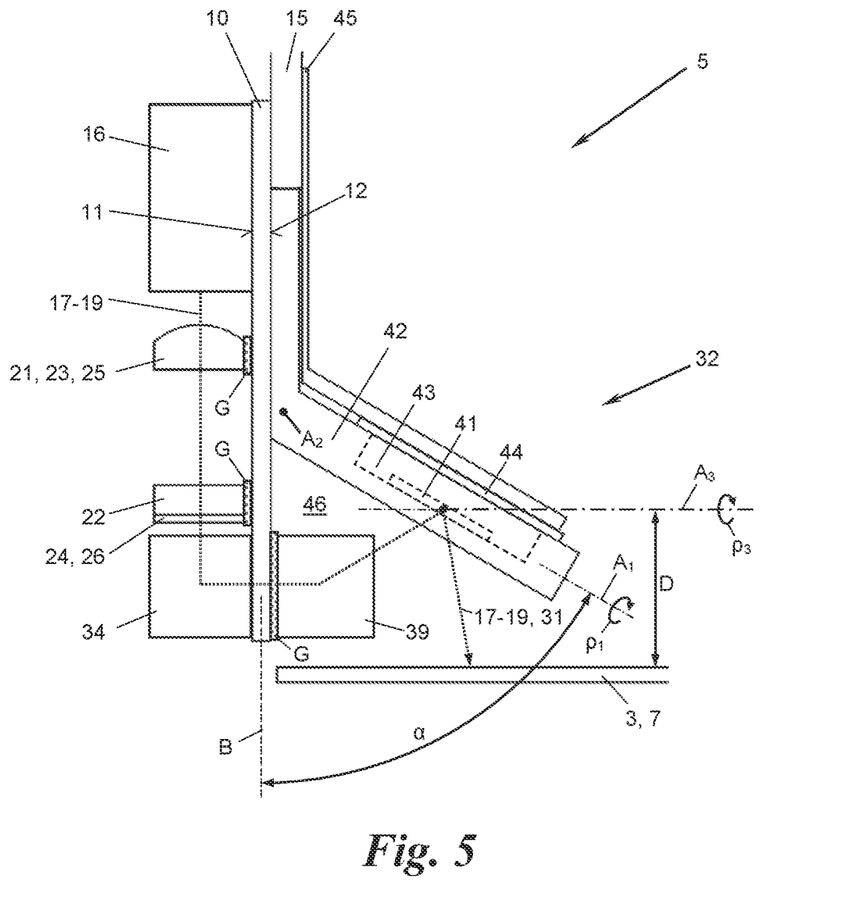

As shown in FIGS. 4 and 5, the MEMS scanning assembly 32 has a scanning mirror 41 movably mounted on an arm 42 which extends from the other side 12 of the base plate 10. The longitudinal axis of the arm 42, i.e., its axis of extension from the base plate 10, is denoted with $A_1$. The scanning mirror 41 is mounted pivotably about one or optionally two perpendicular axes of pivot on the arm 42 and oscillates about those axis/axes under the agitation of electromechanical, electrostatic or piezoelectric actuators 43 controlled by driving electronics 44. The driving electronics 44 may be connected via a flexible printed circuit (FPC) or ribbon cable 45 to the PCB 15 of the base plate 10.

To scan the light beam/s 17-19, 31 two-dimensionally over the display area the scanning mirror 41 needs to oscillate about two perpendicular axes of pivot; alternatively, two scanning mirrors 41 each oscillating about a different axis of pivot and working in cascade could be mounted on the arm 42.

The arm 42 may be used to mount the light guide 30 in addition or alternatively to the base plate 10.

The arm 42 extends under an angle α, measured at the front end 14 between its axis of extension $A_1$ and the plane of extension B of the base plate 10, from the other side 12 of the base plate 10 so that the active (reflecting) side of the scanning mirror 41 faces the base plate 10 under that angle α when the scanning mirror 41 is at rest; when it oscillates, the facing angle will vary accordingly. The angle α can be in the range of ≥20° and ≤90° or more, in particular an acute angle in the range of ≥20° and <90°, and particularly about 60° for this purpose.

The arm 42 is as close as possible to the front end 14 of the base plate 10 so that the light projector module 5 can be placed at a minimized distance D from the desired display area, e.g., the semi-transparent combiner 7, a projection screen or the user's eye, to maximize the user's field of view. When a semi-transparent combiner 7 in form of a waveguide is used, the reduction of the distance D has the further benefit that the footprint of the light beam/s 17-19, 31 at the input coupler of the waveguide is reduced, which in turn reduces adverse interactions within the waveguide and the input coupler. As a consequence, a more efficient and more uniform image 6 is presented to the user at the output of the waveguide.

The arm 42 originates at the side 12 from a point close to that point where the light guide 30 exits. In this way, the arm 42 encloses with the front end section of the base plate 10 a small wedge-shaped space 46. This space 46 can conveniently be used to accommodate the end of the inverting prism 37, the wave plate 38 with the aperture 40, and the separate prism or mirror 39, see FIG. 5.

The Y— or bifurcate shape of the front section of the light projector module 5 formed by the arm 42 and the front end section of the base plate 10 allows the scanning mirror 41 to be hit by the light beam/s 17-19, 31 from its side facing the exit of the light guide 30 while concurrently allowing the scanned light beam/s 17-19, 31 to leave the scanning mirror 41 unhinderedly in the desired projection direction. This allows the light projector model 5 to be integrated, e.g., in the corner area of the temple 4 of the spectacle frame 2 with a minimum distance D to the semi-transparent combiner 7 or a projection screen mounted in front of the user's eye.

Figure 2:
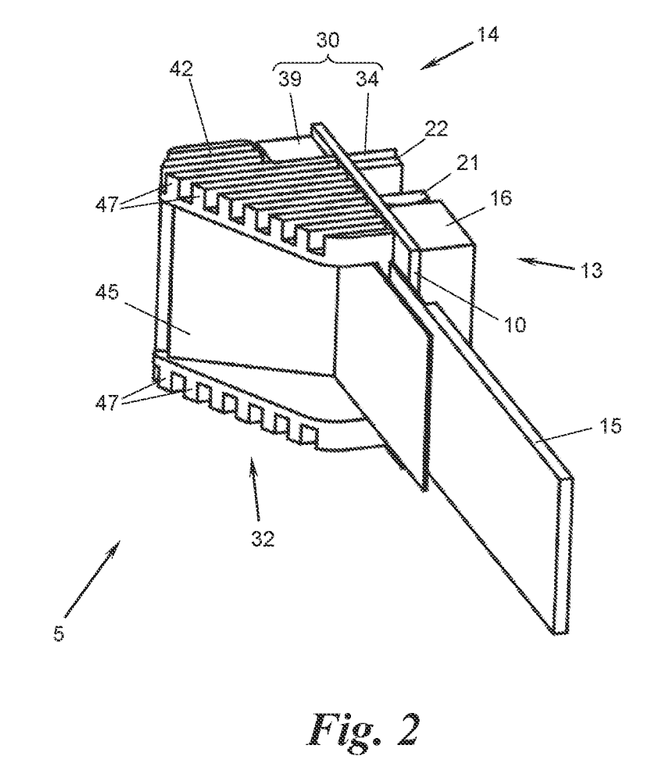
FIGS. 2-5 the light projector module of the disclosed subject matter in a bottom perspective view (FIG. 2), a fragmentary top perspective view (FIG. 3), a fragmentary front perspective view (FIG. 4) and in a fragmentary side view in front of an eye glass (FIG. 5), respectively.
Figure 3:
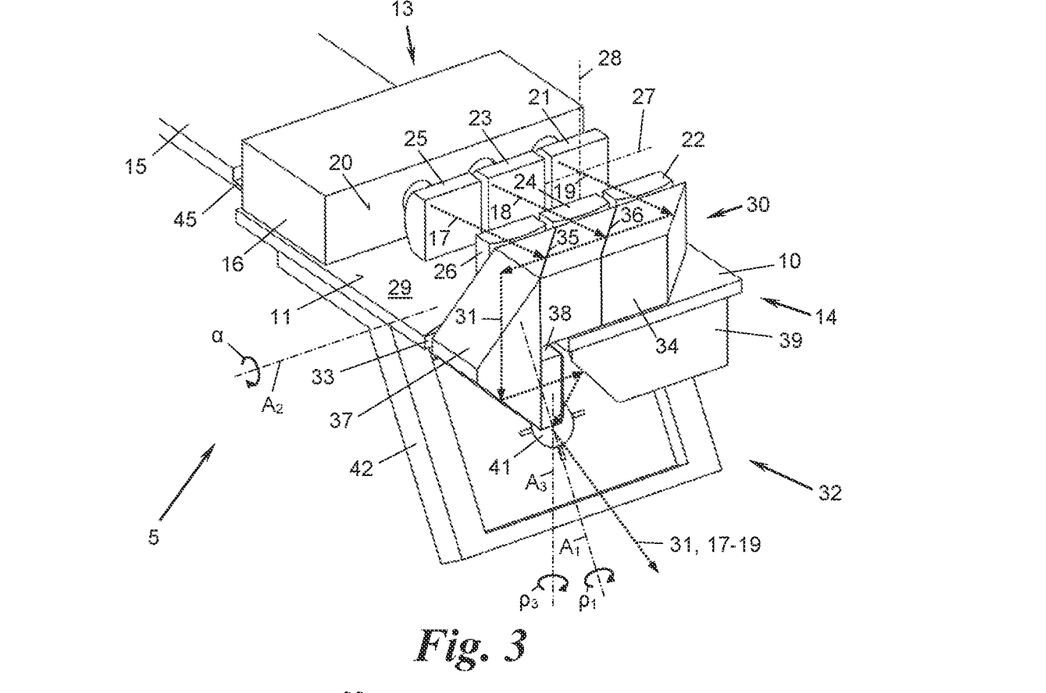

The arm 42 can be a single arm on one side of the scanning mirror 41 or a double arm or frame enclosing the scanning mirror 41 as shown in FIGS. 2-4. The arm 42 could also be a flat plate which supports the scanning mirror 41 on its side facing the base plate 10.

The arm 42 can further be co-used as a heat sink for dissipating waste heat from the light source 16. To this end, the arm 42 is of a thermally conductive material, such as aluminium, steel or another metal, and thermally connected to the light source 16 via the base plate 10 made of metal or appropriately metallized, to conduct the waste heat of the light source 16 into the arm 42. As shown in FIG. 2, the arm 42 can be additionally provided with cooling ribs or fins 47 to improve convection and radiation of the waste heat into the environment. It should be noted that using the arm 42 as heat sink does not use up any additional mounting space for the light projector module 5 as, e.g., the cooling fins 47 can be added to the arm 42 in unused side areas of the wedge-shaped space 46, see FIG. 2.

The arm 42 can optionally be mounted adjustably on the base plate 10 around an axis of pivot $A_2$, for example by articulating the arm 42 on the base plate 10 via a hinge, to change the angle α. Furthermore, the arm 42 can optionally be mounted for a rotational adjustment around its axis of extension $A_1$ with respect to the base plate 10, e.g., via a rotational bearing. The arm 42 can then be swivelled by an angle ρ of, e.g., ±45° around its axis of extension $A_1$, to provide for different coupling directions into the display area or semi-transparent combiner 7.

Instead of or in addition to the adjustments around the axes $A_1$ and/or $A_2$, the arm 42 can also be mounted for a rotational adjustment around an axis $A_3$, which is perpendicular to the base plate 10, to swivel it by an angle $ρ_3$ of, e.g., +45° around that axis $A_3$. The axis $A_3$ may pass, e.g., through the axis $A_2$ or through the center of the mirror 41.

Figure 6A:
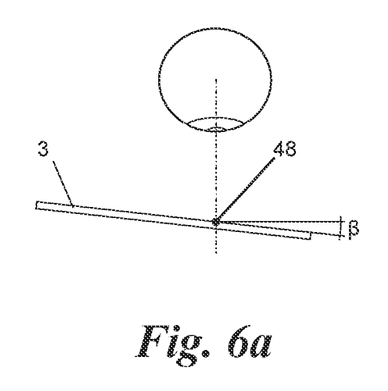
FIGS. 6a and 6b face wrap tilt and pantoscopic tilt angles, respectively, of an eye glass with a schematic representation of an eyeball in top views.
Figure 6B:
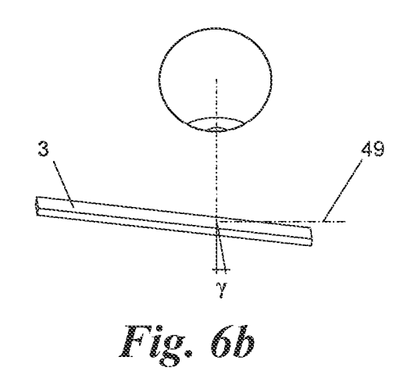

By adjusting the position and angle of the separate prism or mirror 39 and/or the position and angle/s α and/or $ρ_1$ and/or $ρ_3$ of the arm 42 the overall projection direction of the light projector module 5 can be changed. This can be used to adapt the light projector module 5 to application-specific positions and/or tilts of the display area, such as of the semi-transparent combiner 7. FIGS. 6a and 6b show two different types of tilts which a semi-transparent combiner 7 attached to (or integrated into) an eye glass 3 may encounter:

A so-called face wrap tilt angle β about a vertical axis 48 (FIG. 6*a*) and a pantoscopic tilt angle γ about a horizontal axis 49 (FIG. 6*b*).

The angles α, $ρ_1$, $ρ_3$ of the arm 42 could even be changed during operation of the light projector module 5, for example to increase or decrease the effective field of view or to adapt a pair of AR or VR glasses 1 to a foveation of the user's eyes. To this end, one or more suitable actuators can be used to pivot and/or swivel the arm 42 with respect to the base plate 10, e.g., electromechanical, electrostatic, piezoelectric, pneumatic or hydraulic actuators.

Figure 7:
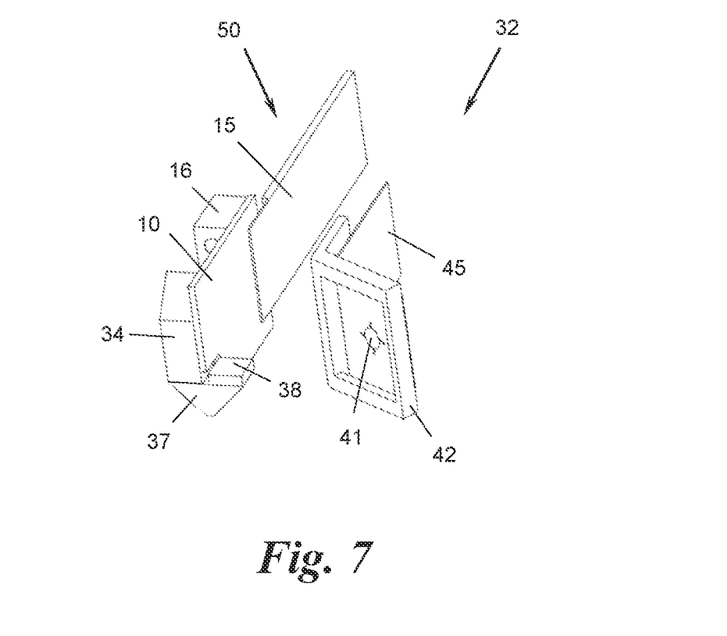
FIGS. 7 and 8 sequential steps of the method of the disclosed subject matter for manufacturing the disclosed light projector module of FIGS. 1-5 in two fragmentary perspective views.
Figure 8:
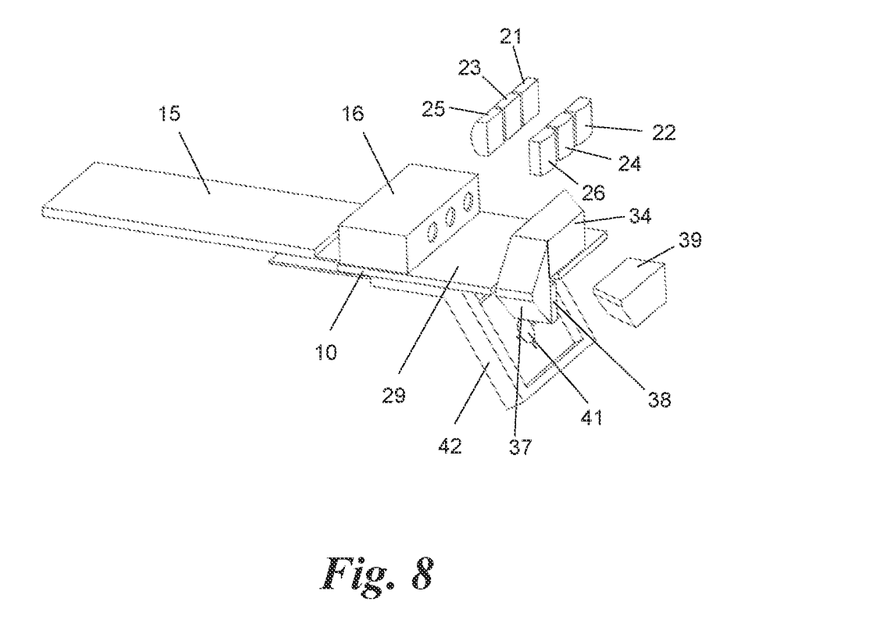

With reference to FIGS. 7 and 8 a method of manufacturing the light projector module 5 will now be explained in detail. The method takes advantage of the mounting surface 29 accessible on the side 11 of the base plate 10 and the wedge-shaped space 46 which is accessible at the front end 14 of the light projector module 5.

In a first step shown in FIG. 7, the light projector module 5 is fully assembled except for the lens set 21-26 and optionally the separate prism or mirror 39. In particular, a sub-assembly 50 comprised of the base plate 10, the (optional) PCB 15, the light source 16 and the light guide 30 (optionally without the prism or mirror 39) is fully assembled and then mated with the fully assembled MEMS scanning assembly 32 by mounting the arm 42 on the other side 12 of the base plate 10. The sub-assembly 50 and the MEMS scanning assembly 32 are electrically connected via the FPC or ribbon cable 45. As a result of the first step of FIG. 7, the light projector module 5 is insofar fully functional in that the light source 16 can be switched on to emit the light beams 17-19 and the scanning mirror 41 can be operated to oscillate.

In a second step shown in FIG. 8, the lens set 21-26, and optionally also the prism or mirror 39 if it is used and if it has not already been mounted in the first step, are inserted into the beam paths of the light beams 17-19, 31, adjusted in positions ("aligned") and finally mounted fixedly. During the alignment the light source 16 is operated and the final output of the light projector module 5, i.e., the light beam/s 17-19, 31 reflected by the scanning mirror 41 onto the display area, is continuously monitored in the display area for reaching one or more predefined targets. In particular, the individual lenses 21-26 of the set are first loosely positioned on the mounting surface 29, then adjusted in position (location and/or angle) on the mounting surface 29, until the desired alignment of the light beam/s 17-19, 31 exiting the light projector module 5 has been reached, and lastly are mounted fixedly in the adjusted positions on the base plate 10. As discussed, a hardenable glue G can be used for this purpose which first allows a free positioning of the lenses 21-26 during the alignment while still unhardened and then permanently fixes the lens 21-26 in the adjusted, aligned positions after hardening.

Optionally, also the MEMS scanning assembly 32 is operated during the alignment step of FIG. 8. In this way, non-linear effects of the actuators 43 or driving electronics 44 causing an irregular dynamic behaviour of the oscillating scanning mirror 41 or an uneven curvature of the scanning mirror 41 itself can be taken into account when aligning the lens set 21-26. Of course, instead of discrete targets in the display area which are monitored for alignment, target curves in the display area can be monitored for being followed by the light beam/s 17-19, 31 as good as possible when aligning the lenses 21-26.

When the light guide 30 comprises a separately adjustably prism or mirror 39, in the alignment step of FIG. 8 such prism or mirror 39 can be positioned, adjusted and then fixed to the base plate 10 in the same way as described for the lenses 21-26. Similarly, an adjustable arm 42 can be adjusted to reach the alignment target/s or target curves. When the optional aperture 40 is used, it can be aligned and affixed during the alignment step of FIG. 8, too.

The alignment step of FIG. 8 can even be done in the final application environment of the light projector module 5, e.g., after its integration into the pair of AR glasses 1 with the semi-transparent combiner 7. In this way, any mounting tolerances of the light projector module 5 (here: with respect to the semi-transparent combiner 7 and the frame 2) in the final product and any specific optical properties of the latter can be taken into account during alignment. The mounting surface 29 accessible from the one side 11, which is opposite to the other side 12 where the MEMS scanning assembly 32 operates, makes it very easy to position, adjust and mount the lens set 21-26 in the mounting position of the light projector module 5 in the final product.

The disclosed subject matter is not restricted to the specific embodiments described in detail herein, but encompasses all variants, modifications and combinations thereof that fall within the scope of the appended claims.

What is claimed is:

1. A method of final assembly of a light projector module which comprises a base plate with two opposite sides, a light source mounted on the base plate for emitting at least one light beam, a micro-electro-mechanical-system (MEMS) scanning assembly mounted on the base plate at a distance from the light source for scanning the at least one light beam over a display area, and a set of one or more lenses mounted on the base plate, the method of final assembly comprising steps of:
   firstly, providing the base plate mounted thereon, the light source and the MEMS scanning assembly, wherein the base plate has, between the light source and the MEMS scanning assembly, a mounting surface accessible at one side of the base plate;
   secondly, positioning the set of one or more lenses on the mounting surface and, after the positioning, adjusting the position of the one or more lenses of the set, wherein the at least one light beam is emitted by the light source, deflected by the MEMS scanning assembly and monitored in the display area during said adjusting; and lastly
   mounting the one or more lenses of the set in the adjusted position fixedly on the mounting surface of the base plate to finalize the assembly of the light projector module.

2. The method of claim 1, wherein the MEMS scanning assembly is scanning during said adjusting.

3. The method of claim 2, wherein the set of one or more lenses is positioned on the mounting surface via an unhardened glue and then, after adjusting the position of the one or more lenses of the set, is fixedly mounted by hardening the glue.

4. The method of claim 3, wherein the hardening of the glue includes a use of ultraviolet light.

5. The method of claim 2, wherein the MEMS scanning assembly includes an arm mounted on and extending from an other side of the two opposite sides of the base plate, a scanning mirror is movably mounted on the arm and facing the base plate, and a light guide is mounted on the base plate for directing the at least one light beam from the set of one or more lenses to the scanning mirror, and
   wherein, when adjusting the position of the one or more lenses of the set, a separate prism or mirror is adjusted in position on the other side of the two opposite sides of the base plate, and then, when mounting the one or more lenses of the set, is fixedly mounted in its adjusted position on the base plate.

6. The method of claim 5, wherein the arm is adjustably mounted on the base plate and, when adjusting the position of the one or more lenses of the set, the arm is also adjusted.

7. The method of claim 2, wherein the MEMS scanning assembly includes an arm mounted on and extending from an other side of the two opposite sides of the base plate, a scanning mirror is movably mounted on the arm and facing the base plate, and a light guide is mounted on the arm for directing the at least one light beam from the set of one or more lenses to the scanning mirror, and wherein, when adjusting the position of the one or more lenses of the set, a separate prism or mirror is adjusted in position on the other side of the two opposite sides of the base plate, and then, when mounting the one or more lenses of the set, is fixedly mounted in its adjusted position on the base plate.

8. The method of claim 1, wherein the set of one or more lenses is positioned on the mounting surface via an unhardened glue and then, after adjusting the position of the one or more lenses of the set, is fixedly mounted by hardening the glue.

9. The method of claim 8, wherein the hardening of the glue includes the use of ultraviolet light.

10. The method of claim 1, wherein the MEMS scanning assembly includes an arm mounted on and extending from an other side of the two opposite sides of the base plate, a scanning mirror is movably mounted on the arm and facing the base plate, and a light guide is mounted on the base plate for directing the at least one light beam from the set of one or more lenses to the scanning mirror, and wherein, when adjusting the position of the one or more lenses of the set, a separate prism or mirror is adjusted in position on the other side of the two opposite sides of the base plate, and then, when mounting the one or more lenses of the set, is fixedly mounted in its adjusted position on the base plate.

11. The method of claim 10, wherein the arm is adjustably mounted on the base plate and, when adjusting the position of the one or more lenses of the set, the arm is also adjusted.

12. The method of claim 1, wherein the set of one or more lenses includes a plurality of lenses and each lens of the plurality of lenses is individually adjusted during said adjusting.

13. The method of claim 1, wherein the MEMS scanning assembly includes an arm mounted on and extending from an other side of the two opposite sides of the base plate, a scanning mirror is movably mounted on the arm and facing the base plate, and a light guide is mounted on the arm for directing the at least one light beam from the set of one or more lenses to the scanning mirror, and wherein, when adjusting the position of the one or more lenses of the set, a separate prism or mirror is adjusted in position on the other side of the two opposite sides of the base plate, and then, when mounting the one or more lenses of the set, is fixedly mounted in its adjusted position on the base plate.

14. A method of final assembly of a light projector module which comprises a base plate with two opposite sides, a light source mounted on the base plate for emitting at least one light beam, a micro-electro-mechanical-system (MEMS) scanning assembly mounted on the base plate at a distance from the light source for scanning the at least one light beam over a display area, and a set of one or more lenses mounted on the base plate, wherein the base plate has, between the light source and the MEMS scanning assembly, a mounting surface accessible at one side of the base plate; the method of final assembly comprising:

adjustably mounting the set of one or more lenses on the mounting surface;

adjusting a position of the one or more lenses of the set on the mounting surface, wherein the at least one light beam is emitted by the light source, deflected by the MEMS scanning assembly and monitored in the display area during said adjusting; and fixedly mounting the one or more lenses of the set in the adjusted position on the mounting surface of the base plate to finalize the assembly of the light projector module.

15. The method of claim 14, wherein the MEMS scanning assembly is scanning during said adjusting.

16. The method of claim 14, wherein the set of one or more lenses is adjustably mounted on the mounting surface via an unhardened glue and then, after adjusting the position of the one or more lenses of the set, is fixedly mounted by hardening the glue.

17. The method of claim 16, wherein the hardening of the glue includes the use of ultraviolet light.

18. The method of claim 14, wherein the MEMS scanning assembly includes an arm mounted on and extending from an other side of the two opposite sides of the base plate, a scanning mirror is movably mounted on the arm and facing the base plate, and a light guide is mounted on the base plate for directing the at least one light beam from the set of one or more lenses to the scanning mirror, and wherein, when adjusting the position of the one or more lenses of the set, a separate prism or mirror is adjusted in position on the other side of the two opposite sides of the base plate, and then, when fixedly mounting the one or more lenses of the set, is fixedly mounted in its adjusted position on the base plate.

19. The method of claim 18, wherein the arm is adjustably mounted on the base plate and, when adjusting the position of the one or more lenses of the set, the arm is also adjusted.

* * * * *

UNITED STATES PATENT AND TRADEMARK OFFICE
CERTIFICATE OF CORRECTION

PATENT NO. : 12,311,622 B2
APPLICATION NO. : 17/747570
DATED : May 27, 2025
INVENTOR(S) : Joerg Reitterer et al.

Page 1 of 1

It is certified that error appears in the above-identified patent and that said Letters Patent is hereby corrected as shown below:

In the Claims

Claim 1, Column 10, Line 33:
Now reads: "firstly, providing the base plate mounted thereon"
Should read: -- firstly, providing the base plate and, mounted thereon --

Signed and Sealed this
Twelfth Day of August, 2025

Coke Morgan Stewart
*Acting Director of the United States Patent and Trademark Office*